(12) United States Patent
Loen

(10) Patent No.: US 6,317,816 B1
(45) Date of Patent: Nov. 13, 2001

(54) MULTIPROCESSOR SCALEABLE SYSTEM AND METHOD FOR ALLOCATING MEMORY FROM A HEAP

(75) Inventor: Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,035

(22) Filed: Jan. 29, 1999

(51) Int. Cl.[7] ................................................. G06F 12/08
(52) U.S. Cl. ............................ 711/171; 711/118; 707/103
(58) Field of Search ................................. 711/170, 171, 711/172, 141, 118; 707/103, 201, 205, 206

(56) References Cited

U.S. PATENT DOCUMENTS

| | | | |
|---|---|---|---|
| 4,775,955 | * | 10/1988 | Liu .................................... 711/145 |
| 5,715,430 | * | 2/1998 | Hirayama ........................... 711/141 |
| 5,875,461 | * | 2/1999 | Lindholm ............................ 711/118 |
| 6,052,699 | * | 4/2000 | Huelsbergen et al. ............... 707/206 |
| 6,141,737 | * | 10/2000 | Krantz et al. ........................ 711/171 |

OTHER PUBLICATIONS

Baker, H., "CONS Should not CONS its Arguments, or, a Lazy Alloc is a Smart Alloc", *ACM Sigplan Notices*, vol. 27, No. 3, pp. 24–34 (Mar. 1992).

Baker, Jr., H., "Optimizing Allocation and Garbage Collection of Spaces", *Artificial Intelligence, An MIT Perspective*, vol. 2, pp. 391–396 (1979).

Bozman, G. et al., "Analysis of Free–Storage Algorithms—Revisited", *IBM Systems Journal*, vol. 23, No. 1, pp. 44–64 (1984).

Matsuoka, S. et al., "A Fast Parallel Conservative Garbage Collector for Concurrent Object–Oriented Systems", *IEEE*, pp. 87–93 (1991).

McDowell, C.E., "Reducing Garbage in Java", *ACM SIGPLAN Notices*, vol. 33, No. 9, pp. 84–86 (Sep. 1998).

Monson, L., "Caching & WeakReferences", *JAVA Developer's Journal*, vol. 3, Issue 8, pp. 32–36 (Date Unknown).

Park, Y. et al., "Escape Analysis on Lists", *ACM SIGPLAN '92*, pp. 116–127 (1992).

Smith, L.C., "Software Mechanism to Reuse Object Instances for Improved Performance", *IBM Technical Disclosure Bulletin*, vol. 38, No. 10, pp. 237–241 (Oct. 1995).

Wilson, P. et al., "Dynamic Storage Allocation: A Survey and Critical Review", *Department of Computer Sciences, University of Texas at Austin*, pp. 1–78 (Date Unknown).

* cited by examiner

Primary Examiner—Do Hyun Yoo
Assistant Examiner—Gary J. Portka
(74) Attorney, Agent, or Firm—Merchant & Gould; Roy W. Truelson

(57) ABSTRACT

The present invention is a method of allocating memory storage in a memory storage space commonly shared by multiple processors. The method allocates a minimum apparent memory storage space equal to one cache line and in response to storing an object, said object occupying a memory storage space equal to less than one cache line, the method determines the value of a variable. The method then allocates said memory storage space for said object based on the value of said variable and updates said variable.

16 Claims, 5 Drawing Sheets

```
class ArbThread {
   void run(){// t2.start()
      // invokes run()
      Arb z = new Arb("z");
      Arb y = Arb.y1; // copy locally
      while(true){
         y.change();
         z.change();
      };
   };
};
```
46

```
class Arb {
   static Arb y1;
   void main() {
      Arb x = new Arb("x");
      Arb w = new Arb("w");
      y1 = new Arb("y");
      ArbThread t2 =
            new ArbThread();
      t2.start();
      while(true){
         w.change();
         x.change();
      };
   };
};
```
45

FIG. 2B

MULTIPROCESSOR SCALEABLE SYSTEM AND METHOD FOR ALLOCATING MEMORY FROM A HEAP

FIELD OF THE INVENTION

The invention generally relates to allocating memory storage from a heap, and in particular, to the allocation of cache sized and sub-cache sized objects in a multiprocessor shared cache memory area.

BACKGROUND

JAVA, and other computer programming languages, allocate storage from a memory storage area, often referred to as the heap. JAVA also implements the concepts of threads. Threads are independent units of work that share a common, process local address space. Thus, while threads are a collection of units that can be individually dispatched, the threads share the common, local memory storage.

When processing threads in a language which allocates storage from a heap, especially in multiprocessor configurations, there is a potential for "false sharing" that will at least intermittently affect performance. Modern processors typically select cache line sizes of 128 bytes and sometimes larger powers of two. However, many modern object-oriented languages, especially JAVA, have a much smaller average object size (e.g. sizes of under 32 bytes are common). Sometimes, objects are created by two separate threads, but they happen to share the same physical cache line. Sharing the same physical cache line may happen by chance because the objects' virtual addresses were "close enough" to each other to share a cache line.

If two objects happen to share the same physical cache line and if the two threads access the objects in different processors, then the performance of the processing suffers. This problem occurs because the processors are forced to move the contents of the cache line from one processor to the other. Even a rare occurrence seriously impacts performance since certain forms of this occurrence (especially when at least one of the objects is being modified) cause operations that take 100 or so cycles to resolve when a typical load takes about 1 cycle. Worse, if the event occurs once, then it might happen repeatedly. This leads to situations that are difficult-to-reproduce. For example, a situation may occur where a program sometimes runs well and sometimes runs poorly.

This situation is called "false sharing." When this occurs, even though the hardware "sees" a shared cache line, and invokes worst-case hardware functions to maintain both machines in "synch," in fact the two objects in the same cache line have no dependency on each other. If the objects happen to fall in separate cache lines, nothing would happen except it would run faster. Thus, "false sharing" is an artifact of the cache line size being larger than the individual objects.

To avoid this situation, designers of allocation schemes resort to certain practices. First, using a somewhat drastic measure, the minimum object allocation can be made a cache line in size or ½ a cache line. While this scheme may waste much main memory storage, it results in little or no "false" sharing. But, there is no guarantee that a thread will stay on a given processor, so false sharing might still occur. The per CPU strategy also has the additional problem that sub-dividing the heap may introduce other inefficiencies known in the art. Second, CPU local heaps are utilized under the assumption that modern processor schedulers will try and keep the same thread running on the same processor whenever possible. This generally minimizes other cache performance problems. Thus, assuming threads are not often moved between processors, sub-allocating objects based on the current processor of the thread helps minimize false sharing. But even infrequent movement may reintroduce false sharing.

From the above, it can be seen that in the JAVA language running under multiple processors, there is a need to allocate storage from a thread local heap to minimize or eliminate false sharing.

SUMMARY

In one embodiment, the present invention relates to a method and system of allocating memory storage in a memory storage space commonly shared by multiple processors, the method comprising: allocating a minimum apparent memory storage space equal to one cache line; in response to storing an object, said object occupying a memory storage space equal to less than one cache line, determining the value of a variable; allocating said memory storage space for said object based on the value of said variable; and updating said variable.

In another embodiment, the present invention provides, a multiprocessor system, comprising: a plurality of processors, each processor coupled to a cache for storing data; an external common memory storage space; a bus coupled to said common cache line and said external memory storage space for transferring data between said common cache line and said external common memory storage space; and an independent executable module; wherein said independent executable module allocates memory storage space for at least one object.

In yet another embodiment, the present invention provides a program storage device readable by a computer system, the program storage device tangibly embodying a program of instructions executable by the computer system to perform a method of allocating memory storage on a memory storage space commonly shared by multiple processors, the method comprising: allocating a minimum apparent memory storage space equal to one cache line; in response to storing an object, said object occupying a memory storage space equal to less than one cache line, determining the value of a variable; allocating said memory storage space for said object based on the value of said variable; and updating said variable.

In a further embodiment, the present invention provides, a method of transmitting a product to a computer system, the method comprising: (a) establishing a connection with the computer system; and (b) transmitting the program product being executable by the computer system to perform a method of allocating memory storage on a memory storage space commonly shared by multiple processors, the method comprising: allocating a minimum apparent memory storage space equal to one cache line; in response to storing an object, said object occupying a memory storage space equal to less than one cache line, determining the value of a variable; allocating said memory storage space for said object based on the value of said variable; and updating said variable.

These and various other features of novelty as well as advantages of the present invention will become readily apparent to those skilled in the art from the following detailed description and corresponding drawings. As will be realized, the invention is capable of modification without departing from the invention. Accordingly, the drawings and description are to be regarded as being illustrative in nature, and not as restrictive.

BRIEF DESCRIPTION OF THE DRAWINGS

In the drawings wherein like parts are referenced by like numerals throughout the several views.

FIG. 2b is a block diagram illustrating the executable code in separate threads.

DETAILED DESCRIPTION

Figure 1:
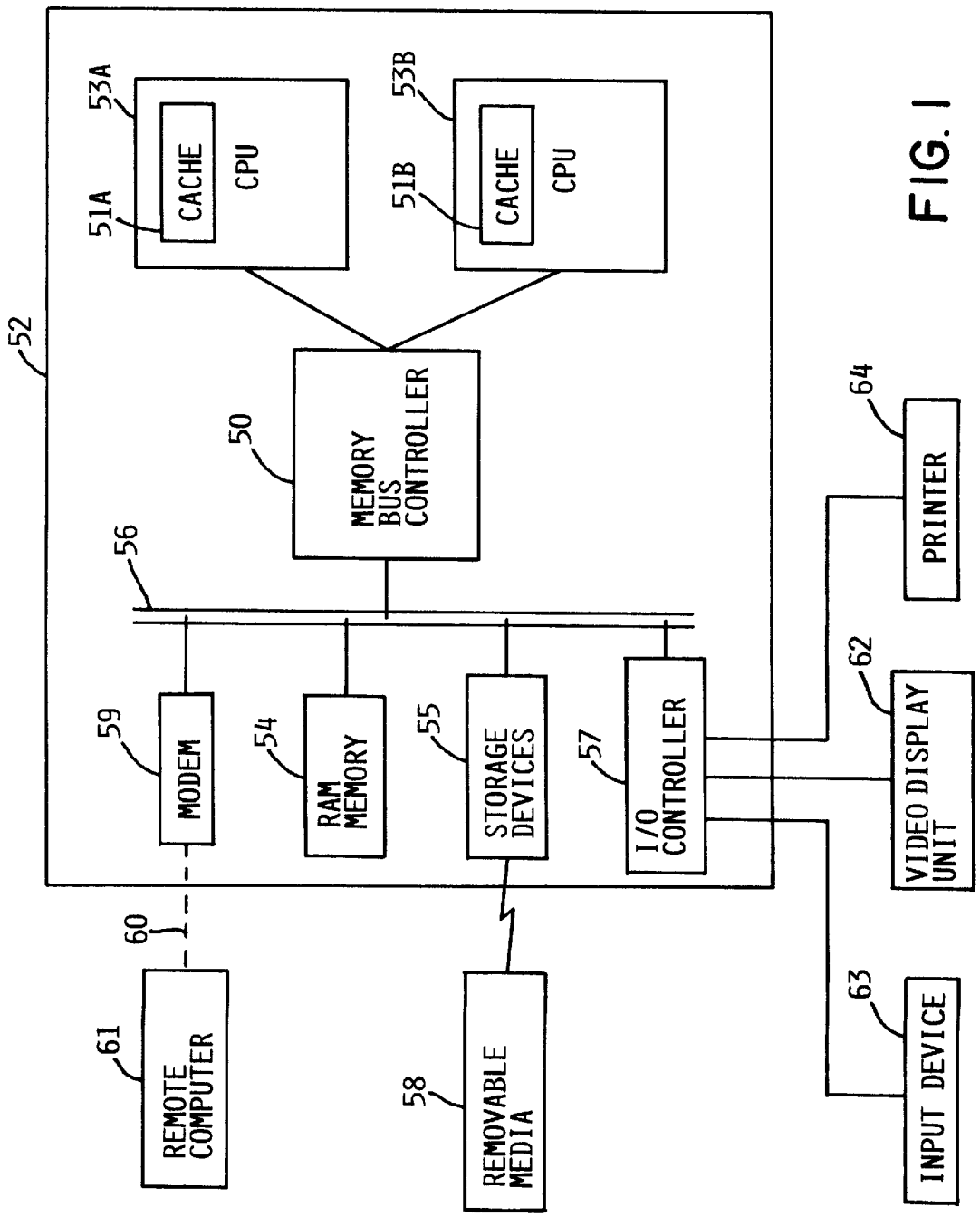
FIG. 1 is a functional block diagram of a multi-processor computer system forming the environment in which the present invention may be employed.

A further description of the present invention will now be deferred pending a brief description of the multi-processor computer system illustrated in FIG. 1 in which the present invention may be employed. Multi-processor system (MP system) 52 is a wide variety of available computer systems, which includes computer systems based on chips such as the Intel Pentium family or the PowerPC family of processors. Typical operating systems include the Windows '95, the Macintosh, or the OS/400 operating systems. Other alternatives might include simplified environments such as a Personal Digital Assistant or even a consumer electronics device having a minimal operating system.

All that is required is one or more CPUs 53A and 53B, a memory bus controller 50, memory bus 56, and RAM memory 54. The CPUs 53A and 53B may have optional caches 51A and 51B, respectively. When caches 51 are present, they hold arbitrary fragments of the underlying RAM memory 54.

In accordance with the principles of the present invention, the multi-processor computer system includes an organization where 128 byte chunks called "cache lines" retain cached copies of main storage. The first address of each byte is on a 128 byte boundary of some storage the programmer views as held in RAM memory 54. It will appreciated that sizes other than 128 are possible. There may also be some form of "read only random access memory" (not shown) that operates similarly to RAM memory 54, with the exception that ROM memory cannot be altered. These schemes and relationships are well known in the art. In one embodiment, well-known means provided by the Multi-Processor system 52 are used to implement the present invention.

It will be appreciated that since computers are not ends in themselves, some communication of the computer system so far described to some other device is typically required. Such a device, commonly called an I/O Device, typically connects to the system in one of two ways.

In a first embodiment, the device directly communicates with memory bus 56. As such, it may interact in a variety of ways that are well known in the art with memory bus controller 50, RAM memory 54 and in some embodiments, the optional CPU caches 51A and 51B via memory bus controller 50. Illustrative examples of this embodiment are given in the diagram by Modem 59 and storage device(s) 55.

In a second embodiment, the logic for I/O Devices to manage the relationships within Multi-Processor system 52 is placed in one or more devices called an I/O Controller 57. The I/O Controller 57 manages the relationship between RAM memory 54, the memory bus 56, the memory bus controller 50, and any relationships with CPUs 53A and 53B and their caches 51A and 51B, respectively.

I/O Controller 57 would provide one or more alternative communications known in the art so that I/O Devices could attach without knowing the internal details of multi-Processor system 52. Those skilled in the art will appreciate that there may be provided industry standard means such as SCSI or GPIB to ease attachment of I/O Devices and provide appropriate means for translating industry standard means to the requirements of multi-processor system 52. Examples of devices connecting via this second embodiment are shown by Input Device 63, Video Display Unit 62 and Printer 64. Whatever strategy is used to connect to Multi-Processor system 52, the functions of the various I/O Devices may vary extensively. For example, the Video Display Unit 62 might be a unit employing cathode ray tube pixel-based display, an ordinary "dumb" terminal such as a VT100, or a limited size, pixel-based LCD display. The input device might be as simple as an ordinary switch or as complex as a CAT scanner.

All these relationships and underlying means of operation are well known in the art. However, as will be appreciated by those skilled in the art, the present invention would readily incorporate means of attaching I/O not described herein.

Figure 2A:
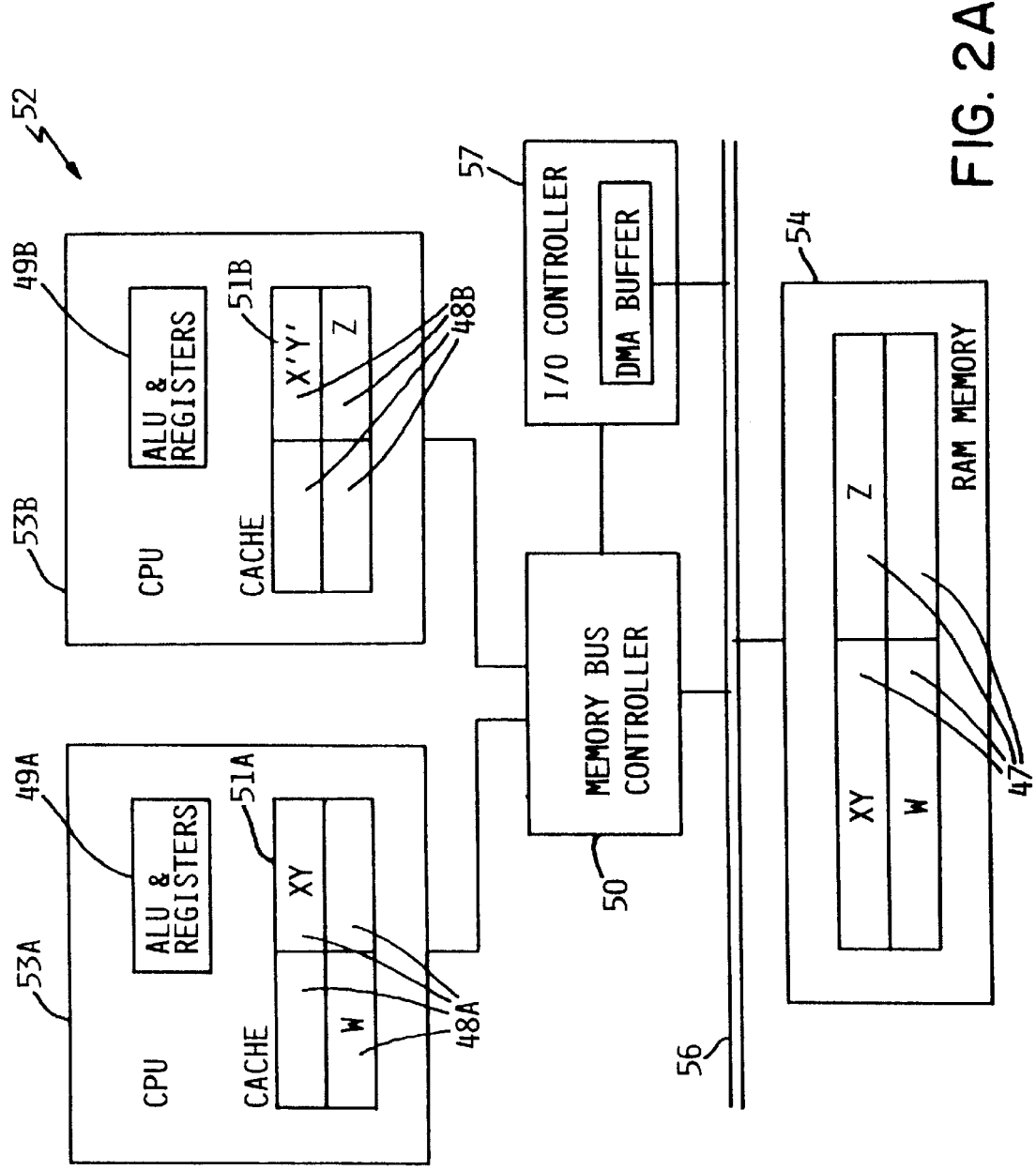
FIG. 2A is a functional block diagram illustrating the caching relationship in a multi-processor computer system.

In order to provide a further example of false sharing, reference should be now be had to FIG. 2A, where a subset of a multi-processing computer system (MP system) 52 is illustrated. This diagram illustrates MP system 52 with at least two Central Processing Units (CPUs) 53A and 53B, each containing caches 51A and 51B, respectively, and a plurality of individual cache lines 48A and 48B, respectively. CPUs, processors, 53A and 53B communicate with each other via Memory Bus Controller 50 so that corresponding storage locations 47 in RAM memory 54 are fetched into the proper cache lines 48A and 48B. RAM memory 54 communicates directly with memory bus controller 50 via memory bus 56. I/O Controller block 57 is connected to the Memory Bus Controller 50 and to the Memory Bus 56.

The names w, x, y and z represent storage created by various JAVA objects as shown in blocks 45 and 46 (best seen in FIG. 2B). These blocks 45 and 46 contain the data residing in the cache lines as a result of a JAVA heap allocation.

The JAVA code fragments in FIG. 2B illustrate a JAVA thread, t1, that creates and starts another thread, t2, and then falls into an infinite loop where the objects referenced by local pointers w and x are continuously changed. Meanwhile, thread t2 falls into a similar loop, but instead modifies objects referenced by y and z.

It will be appreciated that false sharing does not occur for the objects pointed to by w and z. As it happens, they are in separate cache lines and so changing one object does not cause any cache problems with the other. As illustrated in FIGS. 2A and 2B, thread t1 resulted in processor 53A and thread t2 ended up in 53B. Accordingly, cache lines 51A and 51B, resulted in thread t1 for w, and thread t2 for z. However, false sharing can occur for the objects pointed to by x and y. If threads t1 and t2 share the same processor, false sharing will not happen despite the sharing of a cache line by unrelated objects x and y. However, as implied in the diagrammed case, thread t1 is in processor 53A, and thread t2 is in processor 53B. This means that if t1 wants to change x, it must fetch it first into its cache 51A and then into its ALU 49A. Memory Bus Controller 50 fetches the thread from RAM memory 54 or from cache 51B of processor 53B's. Processor 53A will now alter something within its ALU 49A and then present the result to its cache 51A for storage somewhere within x (which is also within the cache line containing x and y). As CPU 53A begins the store, its cache 51A will communicate with Memory Bus Controller 50. However, in this example, it is present in cache lines 48B of processor 53B.

Accordingly, processor 53A's store into the cache will be "held off" until the corresponding cache line 48B in processor 53B is either copied into processor 53A's cache line 48A, written back to RAM memory 54 at the correct location in 47, or both, depending on the specific embodiment. While these activities are happening, processor 53A is idle. The "hold off" operation takes substantially longer than the case where the cache resides only in processor 53A. Letters x' and y' in cache 51B, represent the final stage of the diagram as processor 53B, its changes to y properly moved to the other cache, is in the process of freeing its particular cache line 48B which formerly held x and y. Processor 53B will shortly change y again, causing the cache line to move back from the processor 53A in the same manner. This is the worst-case false sharing situation.

As noted above, the principles of the present invention operate to overcome the problems of "false sharing" by utilizing a relatively simple, thread-based concept of establishing a minimum apparent allocation unit of one cache line. Whenever a smaller object is needed, the thread consults a thread-local variable. First, when the variable is null, a one-cache line sized object is obtained and allocation is normal, except that the storage used for allocation of this sub-cache line object is stored in the thread local storage in a manner in which the location and remaining space are determined and stored. Second, when the variable is not null, the storage it represents can be used to allocate other sub-cache line sized objects until the storage used for allocating sub objects is filled. When this happens, a new allocation 128 byte block is made and is used identically to the null pointer case.

Garbage collection must also account for the fact that an allocation slot might now contain multiple, sub-allocated objects. Those skilled in the art will appreciate that a garbage collector in JAVA cleans the dynamic memory when it is needed and there is available time. The garbage collector marks objects throughout the memory space to which there are references and subsequently removes the unmarked objects.

Accordingly, garbage collection as implemented in accordance with the present invention may be accomplished by utilizing a simple technique. More specifically, the technique is to put a separate "pseudo-object" ahead of any other objects and mark it in a fashion that makes it clear that the pseudo-object cannot be reclaimed until the constituent objects within it all have no surviving references and can hence be collectively reclaimed.

This pseudo-object is created when the 128 byte block of storage is allocated as described above. While not visible to the programmer, garbage collection treats it 'as if' it were an object, except that it has special collection rules as will now be described.

When allocated, the sub-allocated objects make arrangements to logically point to the pseudo-object, making the pseudo-object ineligible for garbage collection. When the constituent objects are themselves eligible for garbage collection at the very moment of collection for an ordinary object, different processing takes place. Instead of simply reclaiming the sub-allocated object's space, it's logical pointer to the pseudo-object is instead destroyed. The pseudo-object is then checked to see if all of its logical pointers to the other sub-allocated objects are also destroyed. If so, then the entire 128 block is reclaimed. If not, no collection takes place. Distinguishing sub-allocated and pseudo-objects from other objects in the system can be done with ordinary status bits and other well known methods.

While this implementation is relatively simple, fragmentation effects may result in some cases. However, the following observations suggest that for languages like JAVA and Lisp, it will be successful from both a fragmentation and false sharing point of view. First, JAVA creates a numerically large and important class of objects called "immutable objects" (e.g. String). These immutable objects can only be modified when they are first created. Subsequently the objects can only referenced. To "modify" an "immutable" object, the object itself is not modified. Instead, the object reference to it is made to point to a newly created object. Thus, for a string, a JAVA statement of the form:

String c="This is a string"; c=c+"and another";

may appear to add the storage for "and another" to the original string ("This is a string"), all using a single instance of the object referenced by "c." However, that is not what happens internally in JAVA. The function above is performed where first an object is created to hold "This is a string" and its reference is stored in variable "c." For the second statement, internal storage is allocated and the storage for "This is a string" currently referenced by "c" is copied to the internal storage. Next the storage for "and another" is copied at the end of that same internal storage. After the internal storage has the concatenation of the first two strings, the internal storage itself becomes input for a newly allocated and created string, which copies the internal storage into it. The second statement is complete when variable "c" receives a reference to this new storage. If "c" was the only variable which referenced the string containing "This is a string," then the original object containing "This is a string" will be discovered to be available the next time garbage collection runs.

As shown above, in the exact coding successful garbage collection is certain, because the code does not store another reference to "c" before replacing it. Therefore, the original "This is a string" object is never seen by subsequent code and certainly not by another thread. Thus, "modifications" of immutable objects means that combinations of old objects are used to create new ones. Frequently, one or more of the old objects is available for garbage collection immediately thereafter, creating a large number of available immutable objects to be garbage collected. Accordingly, there may be a great many "immutable" and "dead" objects around. This should minimize fragmentation concerns.

Second, false sharing should seldom occur. Since the actual allocation size is a cache line, objects packed into less than a cache line's worth of allocation will be local to a particular thread. Thus, false sharing cannot occur, because objects from different threads seldom share a cache line. While thread "A" is free to give out an object reference to thread "B", in practice (see the discussion of "This is a string" for an example of an object which is never seen except by the thread that creates it) this is not the statistically dominant case. A great many objects live and die with only one thread ever referencing them. Accordingly, the present invention eliminates the most likely false sharing case (i.e., two objects which are completely thread-local-in-practice objects that are never shared between threads, but happen to share a cache line). True thread local allocation is a more preferable method of allocation than a per-processor sub-allocation. For example, in true thread local allocation, thread local storage moves around processors no more often than the thread itself does in any scheme.

Furthermore, since the cache lines tend to be packed with a particular thread's data, total movement will be diminished whenever a thread is reassigned to a processor (more objects from that thread per cache line). Accordingly, this results in better scaling as it again reduces false sharing that happens as a result of reassigning a thread. Fragmentation might improve over per-processor schemes because there is no need to subdivide the heap generally by processor or by thread. Only the current cache line's worth of available storage is involved. The storage is predominantly managed globally, especially by garbage collection.

Figure 3A:
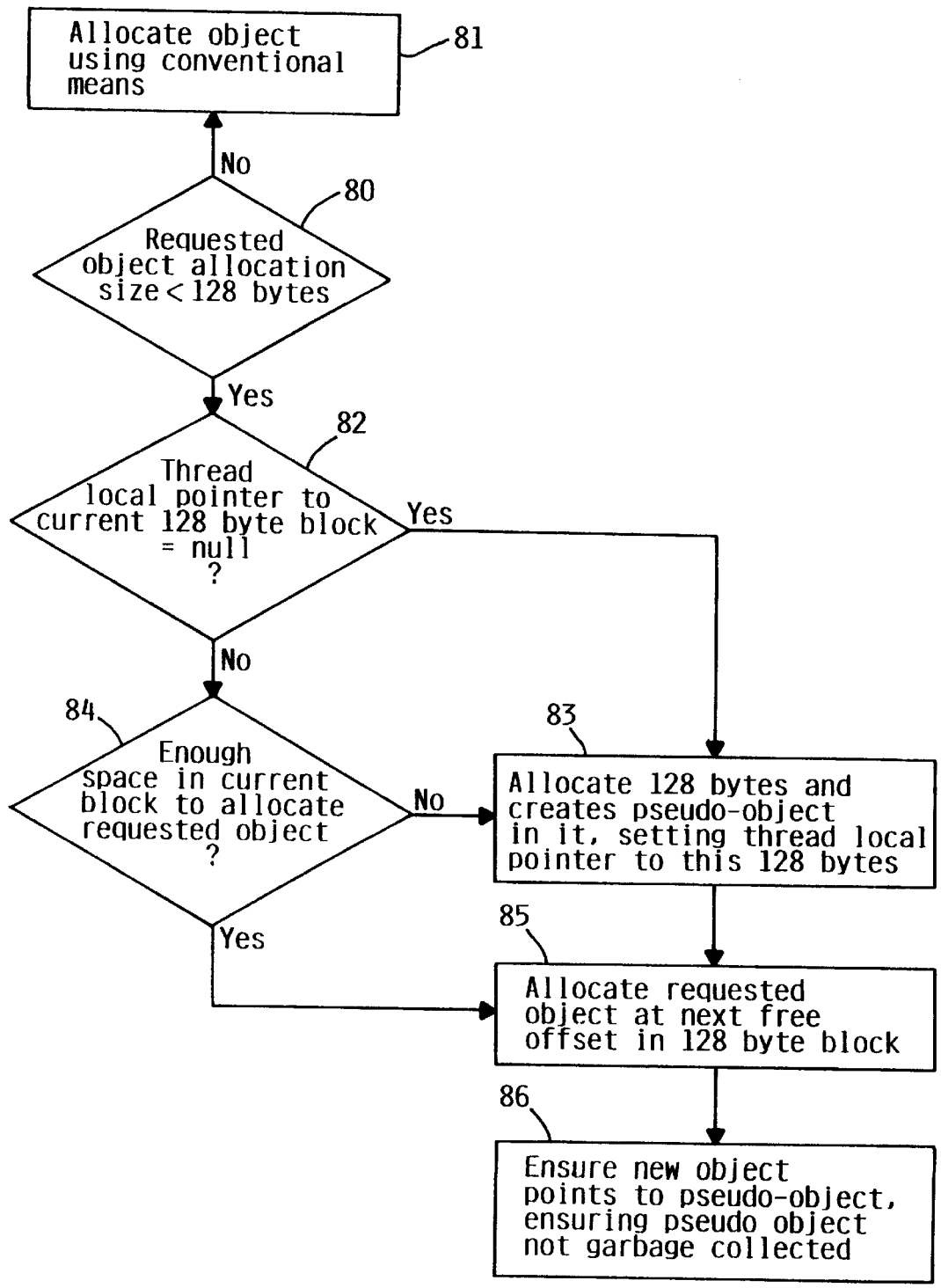
FIGS. 3A and 3B are logic flow diagrams illustrating the steps utilized to implement the changes to an object's allocation; and changes made by garbage collection, in one embodiment of the present invention.
Figure 3B:
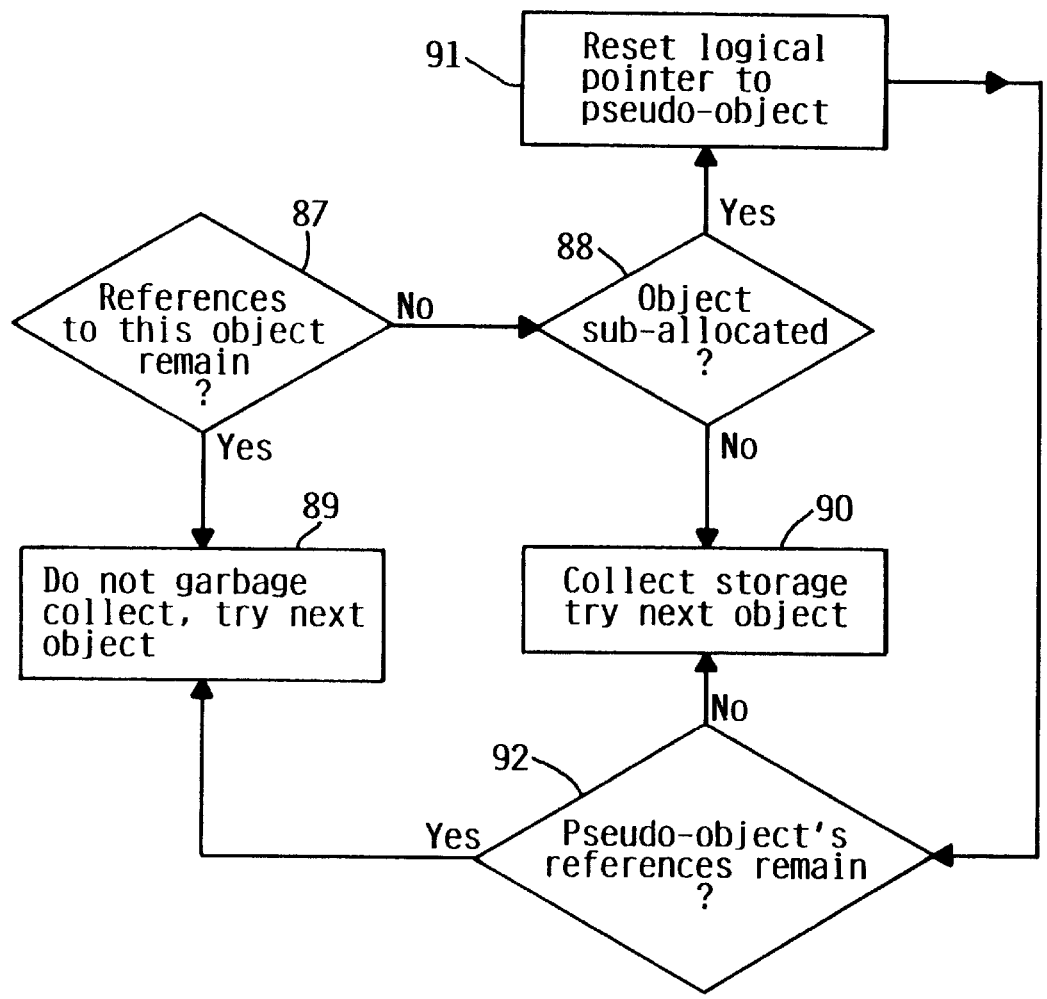

FIGS. 3A and 3B are logic flow diagrams which illustrate the logical steps taken by a processor to implement the principles of the present invention. First in FIG. 3A, the changes to object allocation are described. When other prior logic has determined the correct size of the object, the check in block 80 determines if the object is less than or equal to 128 bytes (i.e., a cache line). If it is 128 bytes or greater, block 81 leads to conventional allocation, which is unchanged for allocation or garbage collection. If less than 128 bytes, checks at blocks 82 and 84 determine if there either is not a local 128 byte block for sub-allocation, or that the current block is too small. In either case, block 83 allocates 128 bytes from the heap as if it were a conventional JAVA object. However, it instead creates a pseudo-object and sets the local pointer of the allocating thread to point to the newly allocated block. If the check at 84 reveals that there is enough existing storage, then the existing block is used.

At block 85, the object is sub-allocated at the next slot (the space is now known to be sufficient). Following that, at block 86, the pseudo-object receives another "logical" reference from the newly-created object. Conventional JAVA references are usually pointers, but in one embodiment of the present invention there is an incentive to using bit maps or other storage saving methods to indicate "pointers." Accordingly, in one embodiment, the present invention will pack multiple objects from the same thread into a single cache line. Since the pseudo-object and sub allocated objects are in close proximity, any suitable means known in the art may be used. For example, the term "logical" implies that something other than an ordinary pointer may be used.

In FIG. 3B, the garbage collection changes are shown. When other logic means has determined that a particular object has no references, it is ordinarily ready for collection (that is, returning its storage to the heap). A well known logic implementation will have an outer loop (not shown) which executes for each object. That outer loop will make the check at blocks 87 to see if the object has any remaining references. If it does, no garbage collection happens at block 89 and execution resumes with the next object at block 87, or the loop terminates. If there are no remaining references to the object, the check at block 88 determines if the object was sub-allocated. If it was not, the conventional object can be collected at block 90. If it was sub-allocated, block 91 resets the logical pointer from the sub-allocated object to the pseudo-object to null or some equivalent value. At block 92, the pseudo-object is then checked to see if all of its references no longer exist. If there are no references, the pseudo-object's 128 byte storage is collected at block 90. If some remain, the 128 byte block is not collected at block 89.

Those skilled in the art will appreciate that the there are some potential "race" conditions. In particular, to collect all of the sub-allocated objects before all of the space of the underlying 128 byte block is used (and to prevent the pseudo-object and the overall 128 byte block from being incorrectly used to allocate storage once it was be returned to the heap), the present invention offers a solution. In one embodiment, the thread local pointers behave as if they were references to the pseudo-object and garbage collection interrogates them in due course so that the pseudo-object survives garbage collection while it is still being pointed to by the thread. In some embodiments, this implementation may be natural, depending on "how much" like an object the pseudo-object is made to look.

The present invention has been described in its presently contemplated best mode, and it is clear that it is susceptible to various modifications, modes of operation and embodiments, all within the ability and skill of those skilled in the art and without exercise of further inventive activity. Further, while the invention has been described in connection with what is presently considered the most practical and preferred embodiments, it is to be understood that the invention is not limited to the disclosed embodiments, but on the contrary, it is intended to cover various modifications and equivalent arrangements included within the spirit and scope of the appended claims.

What is claimed is:

1. A method of allocating memory storage space in a computer system having a plurality of processors and a plurality of caches, each cache being associated with a respective processor, said plurality of caches each comprising a plurality of cache lines of a fixed size, the method comprising the steps of:

defining a common memory storage space for allocation of objects created by a plurality of concurrently executing tasks;

allocating memory space to a first object created by a first task of said plurality of concurrently executing tasks, wherein said memory space allocated to said first object includes a first portion of a first memory address range, said first memory address range being the size of a single cache line and having boundaries defined by a single cache line;

rendering a second portion of said first memory address range unavailable for allocation to any object created by a task other than said first task, said second portion being that part of said first memory address range not allocated to said first object; and allocating at least a portion of said second portion of said first memory address range to a second object created by said first task.

2. The method according to claim 1, wherein said step of allocating memory space to a first object comprises:

determining the value of a variable;

allocating said memory storage space for said first object based on the value of said variable; and updating said variable.

3. The method according to claim 2 wherein said variable is a pointer.

4. The method according to claim 2, wherein the value of said variable corresponds to the location of and the remaining memory space in said first memory address range.

5. The method according to claim 4, further comprising:

storing a plurality of said objects in said first memory address range until said objects completely occupy said first memory address range; and updating said value of said variable;

whereby said updated value corresponds to the location of and the remaining memory space in said first memory address range.

6. The method according to claim 5 further comprising, in response to said first memory address range being filled, updating the value of said variable to a null pointer.

7. The method according to claim 2, wherein said variable is a thread-local variable.

8. The method according to claim 1 further comprising, storing a pseudo-object in said first memory address range, s aid pseudo-object preventing reclamation of storage space in said first memory address range until all objects within said first memory address range are no longer themselves being referenced.

9. The method according to claim 8 wherein said objects within said first memory address range logically point to said pseudo-object in a commonly allocated memory space;

whereby said objects within said first memory address range are made ineligible for garbage collecting.

10. A multiprocessor system, comprising:

a plurality of processors, each processor coupled to a respective cache for storing data, said caches having a common cache line size;

a common memory storage space external to said processors;

a bus coupled to said caches and said common memory storage space for transferring data between said caches and said common memory storage space; and an executable allocation module; wherein said executable allocation module allocates memory storage space for multiple objects created by a plurality of concurrently executing tasks in said multiprocessor system, wherein at least some of said objects are smaller than said common cache line size, wherein said allocation module allocates at least some of said objects smaller than said common cache line size to a memory address range having boundaries defined by a single cache line, and wherein said allocation module prevents allocation of multiple said objects smaller than said common cache line size to a memory address range having boundaries defined by a single cache line where the multiple said objects smaller than said common cache line size are created by more than one of said plurality of concurrently executing tasks.

11. The multiprocessor system according to claim 10, wherein said memory storage space is allocated based on the value of a thread-local variable.

12. The multiprocessor system according to claim 10, wherein said memory storage space is allocated to substantially avoid occurrences of false sharing;

whereby at least one processor invalidates data that is simultaneously located in its cache and the cache of another processor.

13. A program storage device readable by a computer system, the program storage device tangibly embodying a program of instructions executable by the computer system to perform a method of allocating memory storage space in a computer system having a plurality of processors and a plurality of caches, each cache being associated with a respective processor, said plurality of caches each comprising a plurality of cache lines of a fixed size, the method comprising the steps of:

defining a common memory storage space for allocation of objects created by a plurality of concurrently executing tasks;

allocating memory space to a first object created by a first task of said plurality of concurrently executing tasks, wherein said memory space allocated to said first object includes a first portion of a first memory address range, said first memory address range being the size of a single cache line and having boundaries defined by a single cache line;

rendering a second portion of said first memory address range unavailable for allocation to any object created by a task other than said first task, said second portion being that part of said first memory address range not allocated to said first object; and allocating at least a portion of said second portion of said first memory address range to a second object created by said first task.

14. The program storage device according to claim 13, wherein the step of allocating memory space to a first object comprises:

determining the value of a variable;

allocating said memory storage space for said first object based on the value of said variable; and updating said variable.

15. The program storage device according to claim 14, wherein said variable is a thread-local variable.

16. The program storage device according to claim 15, wherein the method further comprises:

storing a pseudo-object in said first memory address range, said pseudo-object preventing reclamation of storage space in said first memory address range until all objects within said first memory address range are no longer themselves being referenced.

* * * * *